May 12, 1925.
R. K. JACK
1,537,612
INSTRUMENT ATTACHING DEVICE FOR MOTOR VEHICLES
Filed May 21, 1924
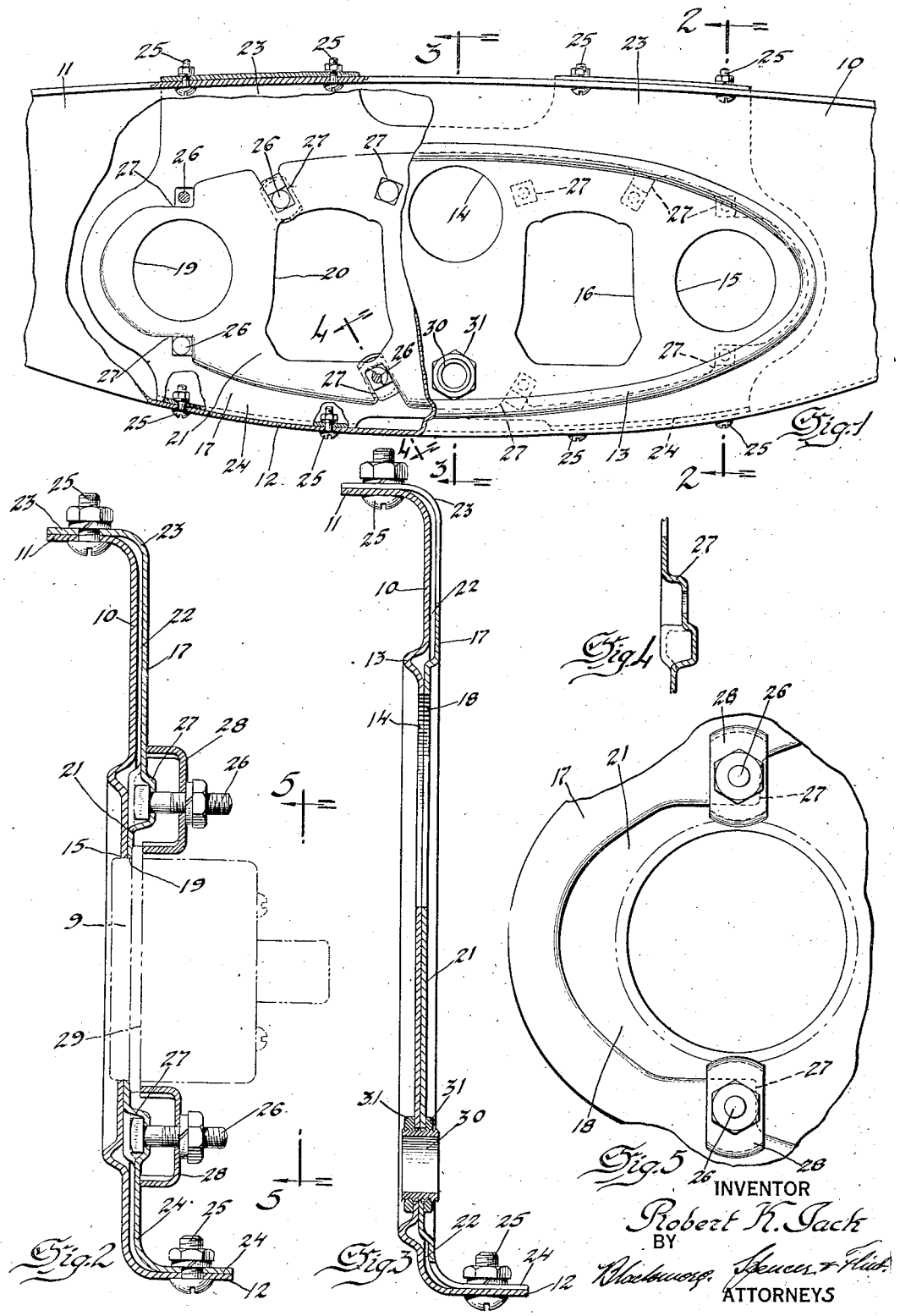

Patented May 12, 1925.

1,537,612

UNITED STATES PATENT OFFICE.

ROBERT K. JACK, OF LANSING, MICHIGAN, ASSIGNOR TO GENERAL MOTORS CORPORATION, OF DETROIT, MICHIGAN, A CORPORATION OF DELAWARE.

INSTRUMENT-ATTACHING DEVICE FOR MOTOR VEHICLES.

Application filed May 21, 1924. Serial No. 714,883.

*To all whom it may concern:*

Be it known that I, ROBERT K. JACK, a subject of the King of Great Britain, and a resident of Lansing, county of Ingham, and State of Michigan, have invented certain new and useful Improvements in Instrument-Attaching Devices for Motor Vehicles, of which the following is a full, clear, concise, and exact description, such as will enable others skilled in the art to which the invention relates to make and use the same, reference being made therein to the accompanying drawings, which form a part of this specification.

My invention relates to instrument boards such as are used in connection with motor driven vehicles to support the various instruments whereby the operating conditions of the motor plant are indicated such, for example, as pressure gauges for indicating the pressure in the oil system, the fuel supply system, or elsewhere, electrical instruments such as voltmeters and ammeters for indicating the conditions of the electrical system of the vehicle, the speedometer for indicating the speed and distance traveled of the vehicle, as well also as such other instruments as may be deemed necessary or desirable in and about motor driven vehicles. In such cases the instrument board is commonly arranged transverse to the vehicle and immediately in front of the driver, so that all the instruments may be readily seen.

In such installations the instruments are commonly fastened to the rear surface of the board (meaning by "rear" the surface which is away from and is not seen by the driver of the vehicle) and the dials or faces of the instruments show through the openings provided in the instrument board. Ordinarily the casings of the various instruments extend through the openings in the instrument board; and the individual instruments have heretofore usually been secured to the instrument board by fastening members extending through the board so as to show upon the front or exposed face thereof next to the operator, or by similar holding means secured to the rear face of the board adjacent the various instruments made use of.

The principal object of my invention is to provide an instrument board of the type referred to wherein the securing means for the separate instruments is entirely concealed, so that no part of the means whereby the instruments are held in place shows upon the front face of the board. This end is attained by providing a support in the form of a plate located to the rear of the board, which support is entirely independent of the board and carries the various fastening members whereby the instruments are held in place. It therefore follows that the separate and individual holding members for the instruments are entirely independent of the instrument board, and are in fact assembled with and carried by a separate plate which is secured in position overlying a part of the rear face of the board.

With the above and other objects of invention in view my invention consists in the improved instrument board illustrated in the accompanying drawings, described in the following specification, and particularly claimed; and in such variations and modifications thereof, within the scope of the concluding claims, as will be obvious to those skilled in the art to which my invention relates.

Referring now to the drawing accompanying and forming a part of the specification, and wherein the preferred embodiment of my invention is illustrated:

Figure 1 is a view showing the central portion of an instrument board as seen by the driver of the vehicle, the board being broken away in part to show the plate upon the rear side thereof, which supports the holding members for the instruments;

Figure 2 is a view upon a considerably enlarged scale showing a section upon a vertical plane at right angles to the instrument board, and the position of which is indicated by the line 2—2, Figure 1;

Figure 3 is a view showing a section upon a central plane likewise perpendicular to the instrument board, and indicated by the line 3—3, Figure 1;

Figure 4 is a fragmentary view showing a section upon a plane perpendicular to the instrument board and extending diagonally through one of the recesses in the plate wherein the heads of the holding bolts for the instruments are received;

Figure 5 is a view showing more particularly the means whereby the instruments are fastened in place, this view showing one end of the plate as seen from a position at the rear of the instrument board, that is, from the side thereof remote from and not seen by the operator of the vehicle.

Referring now to the drawings, the reference numeral 10 designates the instrument board of a motor driven vehicle, the same extending transverse to the operator and being located in front of him as will be appreciated. This instrument board is commonly made from a sheet metal blank bent and shaped in various ways according to the choice of the designer thereof; the board illustrated being one wherein a flange 11 is provided at the top which extends toward the driver, and a flange 12 at the lower edge which extends away from the driver and toward the forward end of the vehicle. The instrument board illustrated is embossed to provide a flange 13 elliptical or oval in form and which encloses the space occupied by the various instruments supported by the board. The instrument board is provided with a plurality of openings 14, 15, 16, as many as may be necessary, through which the dials or faces of the instruments may be seen. Ordinarily the casings of the instruments, as indicated at 9 in Figure 2, extend through these openings and a short distance beyond the surface of the board so as to present a finished appearance about the openings.

The reference numeral 17 designates a plate which is arranged upon and overlies a portion of the rear face of the instrument board, and is thus hidden from the operator of the vehicle, and which plate serves primarily as a support for all the fastening members which are employed for holding the various instruments in place within the openings aforesaid. This plate is provided with a plurality of openings 18, 19, 20 which register with openings 14, 15 and 16 in the instrument board and through which openings the casings of the instrument ordinarily extend, as indicated in Figure 2. It will be appreciated that whereas only three openings are mentioned, the number of such registering openings in the board and plate will be whatever number may be necessary to provide for the instruments to be used in each particular case. As a matter of fact six such registering pairs of openings are present in the embodiment of my invention illustrated.

The plate 17 is illustrated as struck up or dished at its central portion, as indicated at 21, whereby an oval shaped panel-like portion or section corresponding approximately in area with the section of the instrument board set off by the bead 13, and overlying said area, is provided. This portion is offset somewhat from the remaining part of the plate as shown in Figures 2 and 3, so that the portion of the plate beyond the dished or panel section is spaced slightly away from the rear face of the instrument board about the periphery of the plate, as indicated at 22. This scheme secures actual contact between the plate and the instrument board throughout the oval or embossed portions of the two, and a slight spacing away of the plate beyond and outside said sections.

The plate 17 is fastened to the instrument board so that the plate and the instrument holding members which it carries will be held permanently and in proper position overlying the rear face of the board. Preferably the fastening means for the plate is so located that it will not show from the driver's position; and in the embodiment of my invention illustrated this end is accomplished by providing the plate with upwardly and downwardly projecting holding lugs 23, 24 which are bent at right angles at their ends and made to lie in close contact with the upper and lower flange 11, 12 of the instrument board. Suitable fastening bolts 25 extend through these lugs and the flanges whereby, as will be appreciated, the plate 17 is held in place in such a manner that the holding means do not show from the driver's position.

The plate 17 as hereinbefore stated serves as a support for the fastening means employed for holding the various instruments in place relative to said plate and, as necessarily follows, relative to the instrument board. In the form of my invention illustrated the instruments are held in place by fastening means in the form of bolts 26 arranged adjacent each instrument to be held, two oppositely arranged bolts being provided for each instrument in the form of my invention illustrated. The heads of these bolts as shown in Figure 2 are received in recesses 27 struck up from the material of the plate 17, said recesses being of approximately the same size as the bolt heads serve to prevent the heads from turning as the nuts of the bolts are tightened in the act of fastening the instruments in place, and having holes in their bottom walls through which the bolts pass. The recesses located near the central portion of the plate, as will be understood from Figures 1, 2 and 4, have parallel side walls, whereas the recesses at the ends of the plate have side walls which extend at right angles to one another. This comes about because of the location of the recesses relative to the periphery of the dished portion 21 of the plate 17; and in all instances they provide walls with which the heads of the bolts engage, to prevent the heads from turning, as above pointed out.

The instruments themselves may be held in place by the bolts through various specific auxiliary devices, the immediate holding members illustrated being in the form of U-shaped clips 28 through which said bolts extend. One leg of each of these U-shaped clips engages a flange 29 with which the instrument casings are originally provided, while the other leg abuts against the rear surface of the plate 17, as clearly shown in Figure 2 of the drawing. Obviously, however, the particular form of holding member through which the instruments are held in place by the bolts will vary with different instruments, and will be determined, largely, by the form of instrument casing in each particular case.

It therefore follows that the entire holding means for the individual instruments with which the vehicle may be equipped are carried by the plate 17 and that no part, element or feature of the instrument fastening means can possibly show upon the face of the instrument board which is exposed to the operator. This provides a construction wherein the exposed face of the instrument board is smooth and uniform throughout, and in which the enamel cannot become broken or otherwise disfigured as is the case in instrument boards wherein the holding members for the instruments are attached to the instrument board. In such cases if the holding members extend through the board, they necessarily show; and if they are fastened to the rear portion of the board as by being welded thereto, or if in the form of bolts the heads of which while extending through the board are finished off smooth, and the board subsequently enamelled, then in either case any bending of the holding members will tend to and frequently does crack the enamel, thus producing the unsightly surface of the instrument board.

In my improved scheme for fastening the instruments in place, however, no cracking of the enamel can possibly occur, as the entire holding means for the instruments is carried by a plate which is entirely separate from the instrument board but is fastened thereto so as to form a unitary structure therewith. This plate is preferably fastened to the instrument board in such a manner that the fastening means does not show, or at least is not at all prominent from the driver's position, as the spaced fastening members 25 along the upper and lower flanges of the instrument board are obviously disposed in planes at right angles to the instrument board itself, and are therefore not noticeable.

I prefer to provide means for holding the plate 17 and the instrument board together independently of the fastening means hereinbefore referred to so that vibration of the vehicle can under no circumstances produce rattling by the said parts striking against one another. Various means may be provided for thus holding the plate and board together, the preferred means illustrated comprising a threaded sleeve 30 which fits within a smaller registering pair of openings in the plate and instrument board (provided for a throttle controlling device for use in starting) said sleeve having nuts 31 thereupon which engage opposite faces of the board and plate. It will be understood, however, that a flange at one end of the sleeve may take the place of one of the nuts, and in fact that various fastening means may be employed for holding the plate and instrument board in engagement at their central portions to thereby prevent rattling.

Having thus described and explained my invention I claim and desire to secure by Letters Patent:

1. The combination with an instrument board having a plurality of openings into which the exposed ends of various indicating instrument casings may enter, of a plate arranged adjacent and overlying a portion of the rear side of said board, and having openings arranged so as to register with the openings in said board; means for fastening said plate to said instrument board; and holding means carried by said plate for holding instruments in place within said openings.

2. The combination with an instrument board having a plurality of openings, of a plate arranged adjacent and overlying a portion of the rear face of said board, and having openings so arranged as to register with the openings in said board; fastening means arranged along the upper and lower edges of said instrument board and said plate for fastening said members together along their edges; and holding means carried by said plate and located adjacent the openings aforesaid for holding instruments in place relative to said openings.

3. The combination with an instrument board having a plurality of openings, of a plate arranged adjacent and overlying the central portion of the rear face of said board, and having openings so arranged as to register with the openings in said board; fastening means arranged along the upper and lower edges of said instrument board and said plate for fastening said members together along their edges; and a plurality of bolts carried by said plate for holding instruments in place within said openings.

4. The combination with an instrument board having a plurality of openings, of a plate arranged adjacent and overlying the central portion of the rear face of said board and the central portion of which plate is offset toward said board so as to lie in contact therewith, while the peripheral portion thereof is spaced apart from said board, said plate having openings so disposed as to register with the openings in said board; means arranged outside said offset central portion for fastening said plate and said instrument board together; and holding means carried by said plate for holding instruments in place within said openings.

5. The combination with an instrument board having a plurality of openings, of a plate arranged adjacent and overlying the central portion of the rear face of said board and the central portion of which plate is offset toward said board so as to lie in contact therewith, said plate having openings so disposed as to register with the openings in said board; upwardly and downwardly extending pairs of attaching lugs arranged adjacent the end portions of said plate, and which lugs extend to the upper and lower edges of said board; fastening members whereby the ends of said several lugs are fastened to said instrument board at the upper and lower edges thereof; means for fastening the offset central portion of said plate to said instrument board; and holding means carried by said plate for holding instruments in place within said opening.

6. The combination with an instrument board having a plurality of openings, of a plate arranged adjacent and overlying the central portion of the rear face of said board and the central portion of which plate is offset toward said board so as to lie in contact therewith, said plate having openings so disposed as to register with the openings in said board; upwardly and downwardly extending pairs of attaching lugs arranged adjacent the end portions of said plate, and which lugs extend to the upper and lower edges of said board; fastening members whereby the ends of said several lugs are fastened to said instrument board at the upper and lower edges thereof; a threaded sleeve located within one of the pairs of registering openings in said instrument board and in said plate; a nut upon said sleeve engaging said instrument board and plate and whereby said members are fastened together; and means carried by said plate for holding instruments in place within said openings.

7. The combination with an instrument board having a plurality of openings, of a plate arranged adjacent and overlying the central portion of the rear face of said board, and having openings so arranged as to register with the openings in said board; recesses formed in said plate and arranged adjacent said openings, and having holes in their bottom walls; bolts extending through said holes and the heads of which lie within said recesses; holding members with which said bolts cooperate to hold instruments in place within said openings; and means for fastening said plate and said instrument board together.

8. The combination with an instrument board having a plurality of openings, of a plate arranged adjacent and overlying the central portion of the rear face of said board, and having openings so arranged as to register with the openings in said board; recesses formed in said plate and arranged adjacent said openings, and having holes in their bottom walls; bolts extending through said holes and the heads of which lie within said recesses; U-shaped clips through which said bolts extend and which clips are so arranged as to engage instruments and hold them in place within the openings aforesaid; and means for fastening said plate and said instrument board together.

In testimony whereof I affix my signature.

ROBERT K. JACK.